US00RE44642E

(19) United States
(12) Reissued Patent
Cretti

(10) Patent Number: US RE44,642 E
(45) Date of Reissued Patent: Dec. 17, 2013

(54) SELF-SUPPORTING CONSTRUCTION ELEMENT OF EXPANDED PLASTICS, IN PARTICULAR FOR MANUFACTURING FLOOR ELEMENTS AND WALLS OF BUILDINGS IN GENERAL

(75) Inventor: Piero Cretti, Ticino (CH)

(73) Assignee: Plastedil S.A., Chiasso (CH)

(21) Appl. No.: 10/681,354

(22) Filed: Oct. 9, 2003

Related U.S. Patent Documents

Reissue of:

(64) Patent No.: 6,298,622
Issued: Oct. 9, 2001
Appl. No.: 09/425,165
Filed: Oct. 22, 1999

U.S. Applications:

(63) Continuation of application No. 09/284,550, filed as application No. PCT/EP97/05671 on Oct. 9, 1997, now abandoned.

(30) Foreign Application Priority Data

Oct. 15, 1996 (IT) ..... MI96A2137

(51) Int. Cl.
*E04C 1/40* (2006.01)

(52) U.S. Cl.
USPC ..... 52/309.7; 52/309.12; 52/309.16; 52/309.17; 52/600; 52/612; 52/745.19

(58) Field of Classification Search
USPC ..... 52/309.12, 309.7, 309.16, 600, 612, 52/309.17, 745.19
See application file for complete search history.

(56) References Cited

U.S. PATENT DOCUMENTS

| | | | | | |
|---|---|---|---|---|---|
| 2,324,916 | A | * | 7/1943 | Duncan et al. | 52/600 X |
| 2,902,854 | A | * | 9/1959 | Greene | 52/600 X |
| 3,313,073 | A | * | 4/1967 | Mathews | 52/309.11 X |
| 3,484,331 | A | * | 12/1969 | Betz | 52/309.7 X |
| 4,125,981 | A | * | 11/1978 | MacLeod et al. | 52/309.12 |
| 4,128,975 | A | | 12/1978 | Abate | |
| 4,206,267 | A | * | 6/1980 | Jungbluth | 52/309.8 X |
| 4,841,702 | A | * | 6/1989 | Huettemann | 52/309.12 |
| 4,942,702 | A | * | 7/1990 | Lemasson | 52/127.7 |
| 5,245,809 | A | * | 9/1993 | Harrington | 52/309.11 |
| 5,381,635 | A | * | 1/1995 | Sanger | 52/251 |
| 5,638,651 | A | * | 6/1997 | Ford | 52/309.7 |
| 5,729,936 | A | * | 3/1998 | Maxwell | 52/612 X |

FOREIGN PATENT DOCUMENTS

| | | |
|---|---|---|
| EP | 0 459 924 | 12/1991 |
| FR | 2 570 739 | 3/1986 |
| GB | 1 130 727 | 10/1968 |
| WO | WO95/09953 | 4/1995 |

* cited by examiner

*Primary Examiner* — Jeanette E Chapman
*Assistant Examiner* — Daniel Kenny
(74) *Attorney, Agent, or Firm* — Sughrue Mion, PLLC

(57) ABSTRACT

A self-supporting construction element (1, 101) of expanded plastics, in particular for manufacturing floor elements and walls of buildings in general comprises: (1) a central body (2), substantially parallelepipedic in shape and having two opposite faces (6, 7); at least one reinforcing section bar (8,9) transversally extending across the central body (2) between the faces (6,7) thereof and embedded in the expanded plastics; a lath (16) for supporting at least one layer (17) of a suitable covering material, associated to a fin (11,12) of the reinforcing section bar (8,9) lying flush with and substantially parallel to at least one of the faces (6,7) of the construction element (1,101).

89 Claims, 7 Drawing Sheets

Fig. 5
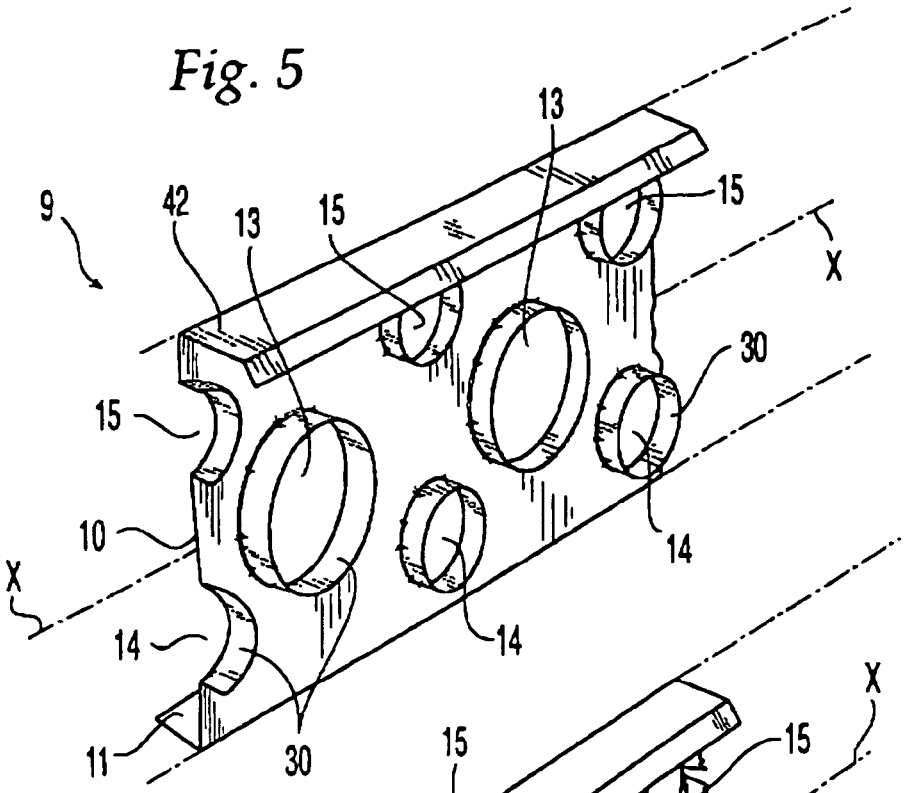
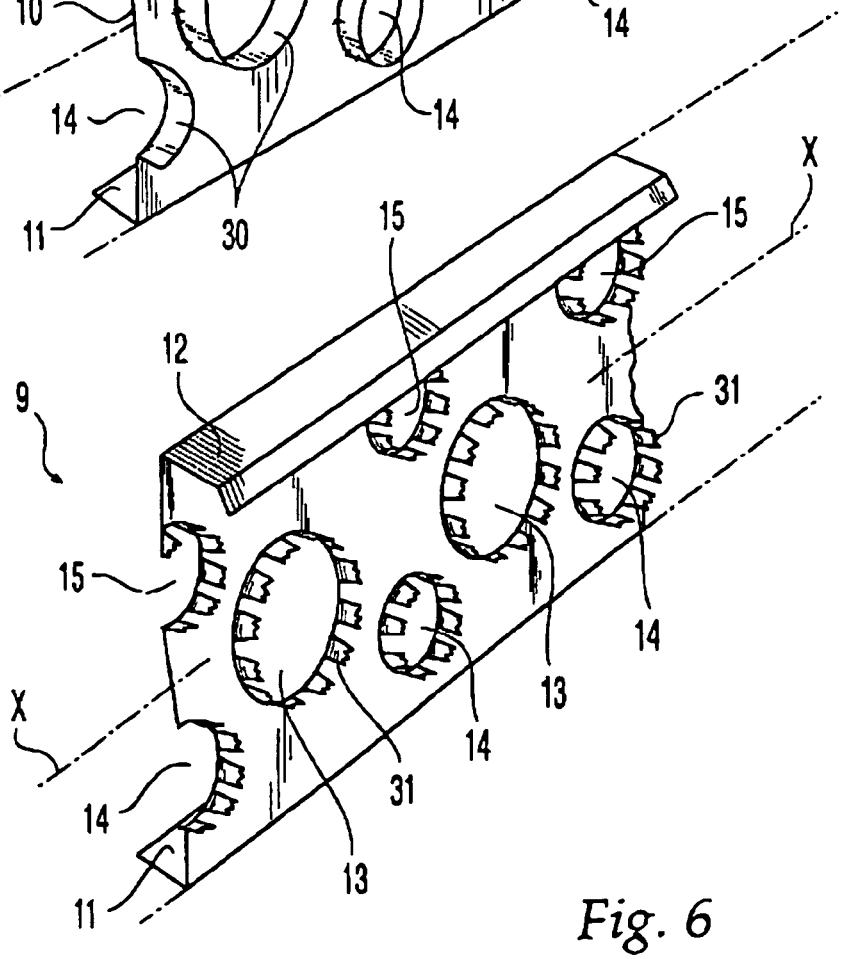
Fig. 6

SELF-SUPPORTING CONSTRUCTION ELEMENT OF EXPANDED PLASTICS, IN PARTICULAR FOR MANUFACTURING FLOOR ELEMENTS AND WALLS OF BUILDINGS IN GENERAL

Matter enclosed in heavy brackets [ ] appears in the original patent but forms no part of this reissue specification; matter printed in italics indicates the additions made by reissue.

[This application is a continuation of U.S. application Ser. No. 09/284,550 filed Apr. 15, 1999 (now abandoned), which was the National Stage of International Application No. PCT/EP97/05671 filed Oct. 9, 1997.] *This is a reissue Application of U.S. Pat. No. 6,298,622 issued Oct. 9, 2001, which was a continuation application of U.S. application Ser. No. 09/284,550 filed Apr. 15, 1999 (now abandoned), which was the National Stage of International Application no. PCT/EP97/05671 filed Oct. 9, 1997; the disclosure of which is incorporated herein by reference.*

TECHNICAL FIELD

This invention relates, in a general aspect thereof, to a self-supporting construction element of expanded plastics material, in particular for manufacturing floor elements and walls of buildings in general.

More particularly, the present invention relates to a self-supporting construction element comprising:

a) a central body, substantially parallelepipedic in shape, provided with opposite faces;

b) at least one reinforcing section bar transversally extending across said central body between said faces and embedded in said expanded plastics.

Throughout the description and the appended claims, the terms: self-supporting construction element of expanded plastics, will be used to indicate a section member made of an expanded plastics material, such as expanded polystyrene, which possesses mechanical properties adapted to withstand without structural yielding all the strains applied thereon during its transportation and installation.

BACKGROUND ART

As is known, the use of construction elements made of expanded plastics, preferably expanded polystyrene, in the forms of boards or section members of suitable shape and size serving thermal and sound insulation functions, has long been accepted by the building industry.

It is also known that, in order to confer adequate self-supporting properties to such construction elements, one or more reinforcing section bars of a suitable shape must be incorporated into the mass of expanded plastics.

Thus, for example, European Patent EP 0 459 924 discloses a self-supporting construction element made of expanded plastics material, specifically a floor element, which comprises a substantially parallelepipedic central body in which a reinforcing section bar, made of a thin metal sheet shaped as an I-beam, is integrated during the molding step.

While construction elements of this kind have on the one hand a light weight, a comparative ease of installation and a low cost, on the other hand their application in the art and flexibility of use have been restrained heretofore by their poor fire-resisting properties.

This inadequate resistance to fire is essentially related to the fact that construction elements made of expanded plastics show an insufficient capability to securely hold outer covering layers, such as the plaster layers used for the outer surface finish.

When exposed to fire, in fact, the expanded plastics soon shrinks into a shapeless mass of reduced volume, with the ensuing separation of the outer covering layers and rapid collapse of the whole structure.

In addition, an undesirable separation of the outer covering layers may be caused in some instances by a premature "aging" of the plastics surface to which these coverings adhere, a separation which may be further fostered by exposure to heat sources, dusts, fumes, vapors, or chemical substances coming from a source close to the construction elements.

DISCLOSURE OF INVENTION

The technical problem underlying the present invention is, therefore, that of providing a self-supporting construction element made of expanded plastics, which allows to overcome the drawbacks mentioned hereinabove with respect to the cited prior art.

According to the invention, this problem is solved by a construction element of the type indicated above, which is characterized in that it further comprises a lath for supporting at least one layer of a suitable covering material, said lath being associated to a fin of said reinforcing section bar lying flush with and substantially parallel to at least one of the faces of said construction element.

In the following description and the subsequent claims, the terms: lath for supporting at least one covering layer, encompass not only conventional mesh—either smooth or provided with protruding ribs—obtained by stretching a suitably notched metal sheet, but also any sheet-like member adapted to support a suitable covering material.

Advantageously, the construction element of the invention may achieve at one time both adequate self-supporting features, as conferred thereon by the reinforcing section bar integrated within the mass of expanded plastics, and adequate fire-resisting properties thanks to the presence of the lath, which is securely held by the same reinforcing section bar.

This lath, in fact, is capable of supporting a covering layer constituted by a suitable construction material even in case of shrinking of the mass of plastics.

In a particularly advantageous embodiment, the lath comprises one or more portions extending flush on opposite lateral sides of the construction element, which may be embedded in and anchored also to the concrete used for incorporating and/or joining together one or more adjacent construction elements.

In addition, a lath thus held securely in place by the reinforcing section bar and/or by the concrete is able to effectively prevent any detachment of the covering layer, even in the presence of the aforementioned aging phenomena of the outer surface of the expanded plastics.

In order to improve to the maximum possible extent the fire-resisting properties of the construction element, the material of the covering layer associated to the lath is preferably selected from plaster, cement, or any other fire-retarding or fire-resistant material, such as composites of cement and reinforcing fibers of an appropriate nature.

Preferably, the reinforcing section bar is constituted by a material having suitable structural properties, such as cold rolled, preferably zinc-galvanized steel, shaped so as to be provided at one end with at least one fin perpendicularly extending from the central portion thereof.

For obvious reasons of manufacturing convenience and in order to lower production costs, the reinforcing section bar is preferably worked to a C, Z or H cross-sectional shape.

In a preferred embodiment of the invention, the reinforcing section bar is longitudinally extending within the central body of the construction element along substantially the entire length thereof and is provided with a pair of fins perpendicularly extending from opposite sides of a central portion.

In this case, the fin which extends flush with the construction element serves the function of providing an adequate supporting surface onto which the lath may be secured, while the opposite fin advantageously carries out the function of improving the compression strength of the reinforcing section bar, thereby enhancing the self-supporting properties of the construction element.

Preferably, this second fin comprises a first rectilinear portion, substantially perpendicular to the central portion of the reinforcing section bar, and an end portion bent toward the central portion and forming with the first portion of the fin an angle ($\alpha$) ranging from 40° to 60° and, still more preferably, equal to about 45°.

Tests carried out by the Applicant have shown that this shape of the fin contributes to further stiffen the reinforcing section bar, and further improves the self-supporting and compression strength properties of the construction element.

Portions of predetermined length of this reinforcing section bar may be obtained by means of conventional bending and cutting operations, known per se, starting from a metal sheet having a height of from 150 to 250 mm and a thickness of from 0.4 to 1.2 mm and, still more preferably, of from 0.5 to 0.8 mm.

Preferably, the central portion of the reinforcing section bar will have, after bending, a height of from 100 to 200 mm, while the fin or opposite fins of the section bar will have a width of from 15 to 30 mm.

Where the reinforcing section bar has two opposite fins, the fin which will become fully embedded within. the expanded plastics material will have an overall width comprised between 18 and 22 mm.

Preferably, the first substantially rectilinear portion of said fin, lying perpendicularly to the central portion of the reinforcing section bar, preferably has a width of from 12 to 18 mm, while the remaining end portion thereof is bent towards the reinforcing section bar to form an angle of about 45°.

Preferably, furthermore, the reinforcing section bar is advantageously provided with a plurality of openings formed in its central portion outside of or included between said fins.

These openings serve the dual advantageous function of lightening the reinforcing section bar thus improving the self-supporting properties of the construction element, and of enabling a better integration of the reinforcing section bar into the mass of expanded plastics.

Thanks to the presence of said openings, in fact, the mass of expanded plastics is able to tightly encapsulate the reinforcing section bar during the molding process, thereby integrating and holding securely in place the reinforcing section bar inside the central body of the construction element.

This intimate integration of the reinforcing section bar within the mass of expanded plastics, moreover, prevents any deformation or transversal flexion of the reinforcing section bar even if the latter is essentially constituted, as mentioned above, by a fairly thin metal sheet.

Preferably, said openings have a total area comprised between 10% and 60% of the overall surface area of the reinforcing section bar, meaning with this latter term the overall lateral surface area of the section bar inclusive of the fin(s) (i.e. the overall lateral surface area before forming the fins and cutting the openings).

Still more preferably, the openings cut through the central portion of the reinforcing section bar account for 30% to 40% of the overall surface area thereof.

According to the invention, the shape of the openings—conventionally obtained in a manner known per se, such as by punching—is not critical; however, a circular cross-section is preferred for evident reasons of manufacturing convenience.

In the latter instance, the openings have a diameter preferably ranging from 15 to 150 mm.

In a preferred embodiment, the openings are positioned in the central portion of the reinforcing section bar along three parallel rows: a first central row of circular openings, having a prevailing diameter, arranged pitchwise along the median plane x-x of the reinforcing section bar, and two side rows of circular openings, having a smaller diameter, arranged pitchwise on opposite parts of the. central row.

Preferably, the circular openings in the side rows have parallel axes and are interposed between two consecutive openings of the central row, as explained hereinafter.

Advantageously, it is possible in this way to more evenly distribute the so-called void areas throughout the central portion of the reinforcing section bar, in order to lighten its structure without detracting from its mechanical strength, and to uniformly spread the contact surface between the reinforcing section bar and the expanded plastics.

Preferably, the pitch between the openings of the central row is equal to the pitch of the side rows and ranges between 80 and 100 mm and, still more preferably, is equal to about 90 mm.

Preferably, furthermore, the openings of the central row have a diameter of from 50 to 80 mm and, still more preferably, of about 60 mm, while the openings of the side rows have a diameter of from 20 to 40 mm and, still more preferably, equal to about 30 mm.

In order to further increase this contact surface and, along therewith, improve the adhesion of the reinforcing section bar to the expanded plastics, the openings cut through the reinforcing section bar may advantageously be provided with a protruding lip along their peripheral edge, or, in the alternative, with one or more protrusions, distributed along their peripheral edge and angularly offset from one another, adapted to provide additional means for anchoring the reinforcing section bar to the mass of expanded plastics.

These protrusions may either be extending from one side of the reinforcing section bar or from both sides thereof.

Preferably, the lath for supporting at least one covering layer is a stretched metallic lath essentially consisting of a rhomb-shaped mesh having a length-to-height rhomb ratio of 2:1.

Preferably, the rhomb length varies between 20 and 60 mm, while the rhomb width varies between 10 and 30 mm.

Preferably, furthermore, the stretched metallic lath has a thickness of from 0.4 to 1.5 mm and, still more preferably, of from 0.4 to 1.0 mm.

In a second embodiment of the invention, the reinforcing section bar transversally extends across the central body of the construction element through the whole thickness thereof, and has a pair of opposite fins lying flush with and substantially parallel to the opposite faces of the construction element.

In this case, the construction element may include a pair of laths, each adapted to support a respective covering layer, associated to a respective one of said opposite fins of the reinforcing section bar.

In this way, it is possible to provide modular wall elements, e.g. for erecting bearing and partition walls for buildings, by pouring concrete into one or more cavities formed in the construction element of the invention and plastering the opposite outer faces thereof.

In a third embodiment of the invention, the construction element may include—instead of the second lath for supporting the covering layer—a rigid covering element associated to the reinforcing section bar on the face opposite to that having the first lath.

Preferably, this covering element is a panel of gypsum paperboard, wood, rigid plastics, or any other suitable material having decorating and/or structural functions.

Depending upon the choice of the covering element, provided or not with structural characteristics, the construction elements of the invention may also achieve advantageous load-bearing characteristics, i.e. be capable of autonomously withstanding possible static loads applied thereon.

According to the invention, the construction elements described above can be manufactured by means of a method comprising the steps of:

associating a lath for supporting at least one layer of a suitable covering material to a fin extending from one end of a reinforcing section bar;

positioning the thus associated reinforcing section bar and lath into a molding seat of a suitable apparatus for molding plastics;

feeding expandable plastics granules into the molding seat;

expanding and then bonding together the plastics granules in said molding seat so as to embed said reinforcing section bar into a mass of expanded plastics having a predetermined shape and to maintain said lath at least in part substantially flush with the mass of expanded plastics.

This method may be carried out by means of molding apparatuses conventional per se and known in the art.

According to the invention, all of the lath or, alternatively, a major portion thereof, will extend substantially flush with the mass of expanded plastics of the construction element leaving the molding apparatus.

Preferably, the lath for supporting the covering layer is associated to the outer surface of the lateral fin of the reinforcing section bar which lies flush on the construction element, by means of electric welding operations and equipment known per se.

Preferably, furthermore, the above method comprises an additional step of partly or fully enucleating said lath from the mass of expanded plastics so as to provide a more effective anchoring to the lath of the covering material and/or of the concrete being cast onto or alongside the construction element.

Preferably, the lath is partly or fully enucleated from the mass of plastics of the construction element by means of an appropriate surface thermal treatment.

In a preferred embodiment, this thermal treatment is carried out by means of a device feeding a,sheet of warm air heated to a temperature of from 220° to 260° C.

Advantageously, the extent of shrinking of the expanded plastics, and therefore the extent of lath exposure, can be adjusted by varying the temperature and/or the warm air flow rate and/or the rate of movement of the hot air feeding device.

In addition, this surface thermal treatment of the construction element may be preceded by a step of scraping the construction element surface, directed to removing the outermost layer, the so-called "skin", of the expanded plastics and enabling a more effective surface thermal treatment.

In a further embodiment, the lath(s) may be attached to the side fin(s) of the reinforcing section bar after having molded the construction element and integrated therein the reinforcing section bar.

In this case, the aforementioned steps of scraping and surface thermal treatment may be carried out before fixing the lath, so that the corresponding lateral fin of the reinforcing section bar can be exposed on the surface, if required.

Thus, according to this further embodiment, the construction element of the invention may be obtained by means of a method comprising the steps of:

positioning a reinforcing section bar, provided with at least one fin at one end, into a molding seat of a suitable apparatus for molding plastics;

feeding expandable plastics granules into the molding seat;

expanding and then bonding together the plastics granules in said molding seat so as to embed said reinforcing section bar into a mass of expanded plastics having a predetermined shape and to maintain said at least one fin substantially flush with the mass of expanded plastics;

associating a lath for supporting at least one layer of a suitable covering material to said at least one fin of said reinforcing section bar.

The construction element thus obtained may be delivered to the construction site as such, or may be further processed downstream of the molding apparatus by associating to the lath(s) for supporting a coating layer of plaster, cement as it is or, optionally, reinforced with fibers of a suitable material.

Where the reinforcing section bar extends across the central body of the construction element throughout its thickness, the construction element may be finished by associating thereto a panel of gypsum paperboard, wood, rigid plastics, or another suitable material for decorating and/or structural purposes.

Further features and advantages of the invention will become more clearly apparent from the following description of some preferred embodiments of a construction element according to the invention, given by way of non-limitative examples with reference to the accompanying drawings.

BRIEF DESCRIPTION OF DRAWINGS

In the drawings:

FIG. 5 is a partial perspective view of a reinforcing bar according to a first modified construction;

FIG. 6 is a partial perspective view of a reinforcing bar showing a second modified construction;

MODES FOR CARRYING OUT THE INVENTION

Figure 1:
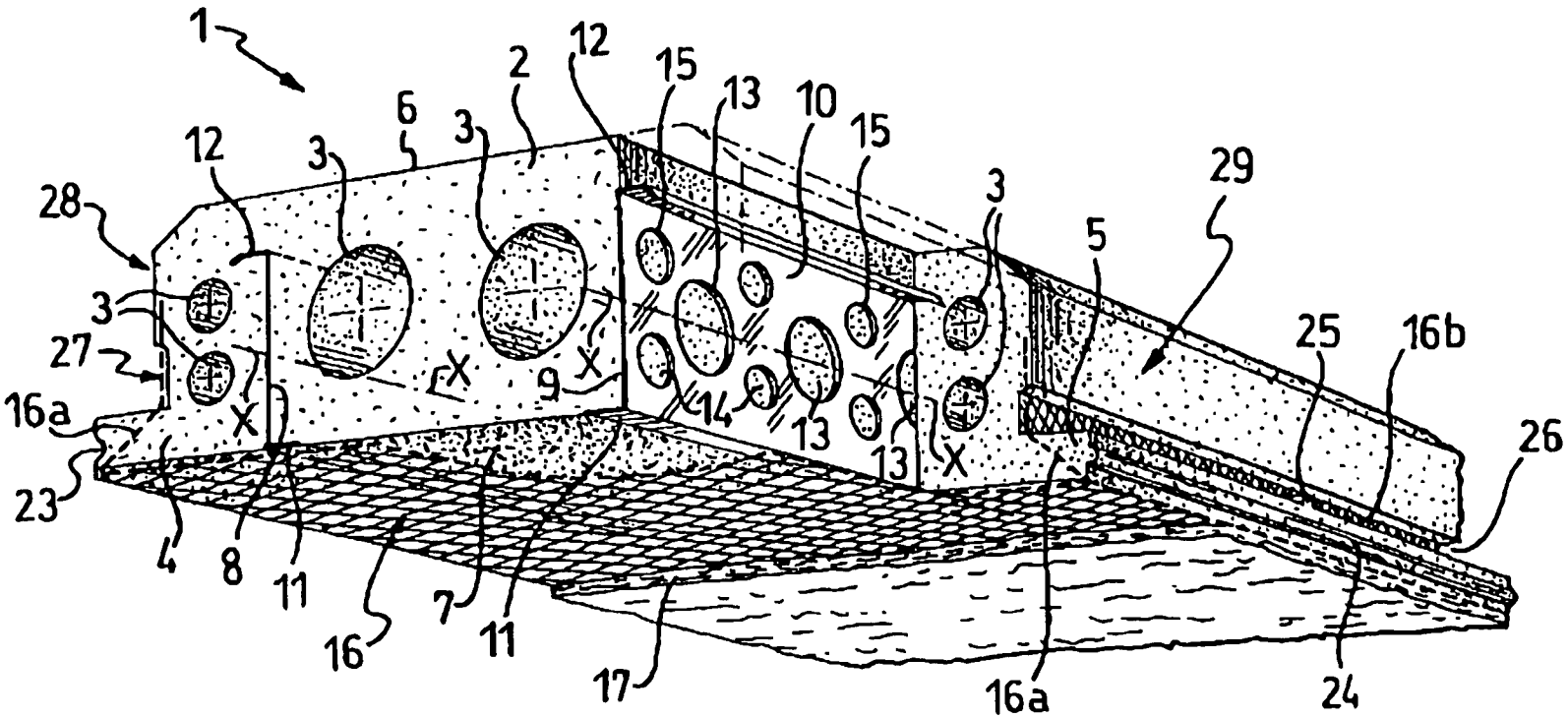
FIG. 1 shows a perspective view, in partial cross-section, of a first embodiment of a construction element according to the invention.
Figure 2:
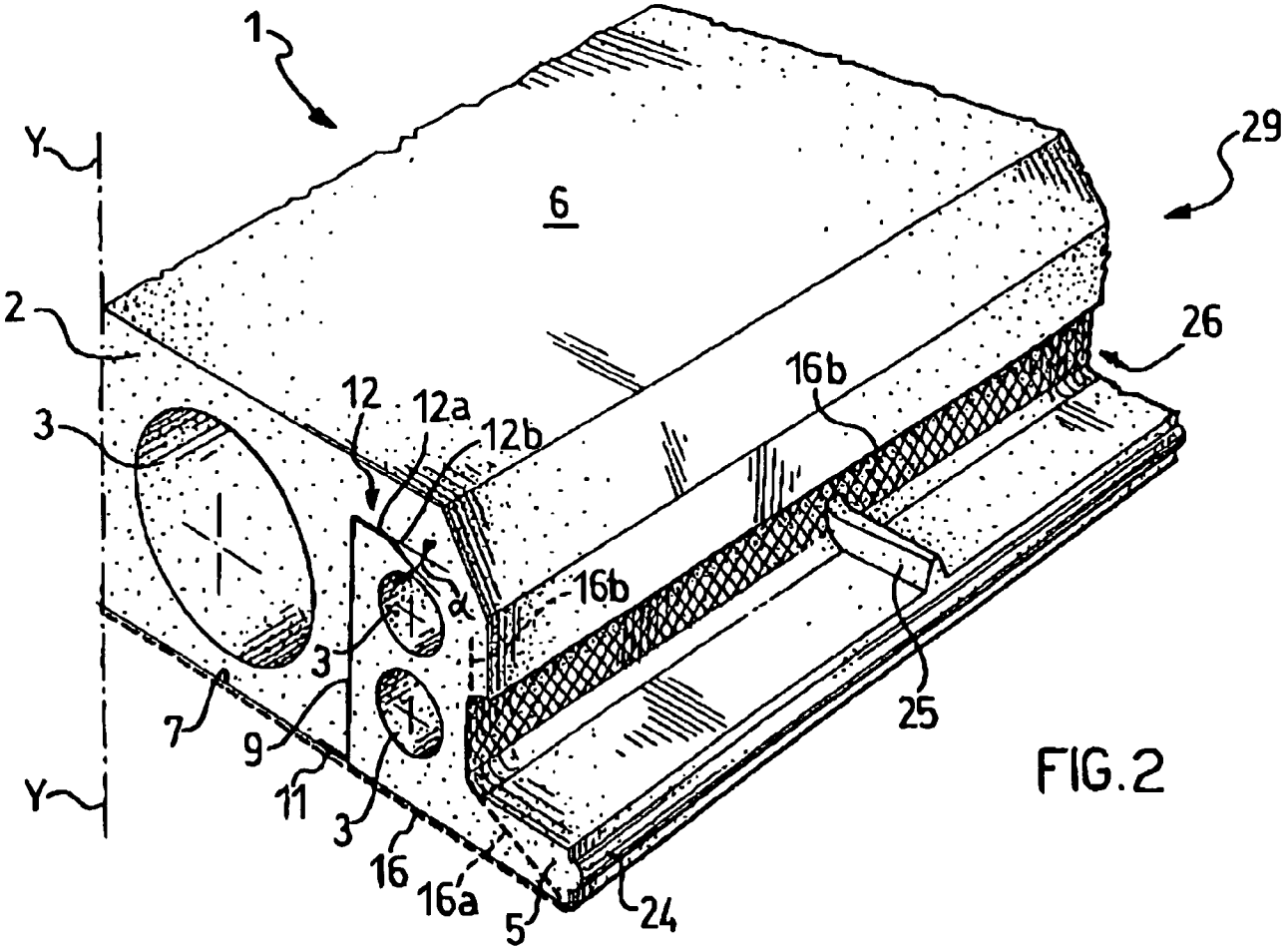
FIG. 2 shows an enlarged-scale perspective view of some details of the construction element of FIG. 1.

Referring to FIGS. 1 and 2, generally shown at 1 is a construction element made of expanded plastics, e.g. expanded polystyrene, according to the present invention.

In the example shown, the construction element 1 is a so-called floor element intended for constructing floors, and comprises a central body 2, having a plurality of parallel cavities 3 longitudinally formed therethrough, laterally provided with opposite sides 28 and 29.

The construction element 1 is also provided with a pair of lugs 4, 5 laterally and longitudinally extending along the opposite sides 28 and 29 of the central body 2.

Advantageously, the lugs 4, 5 are laterally provided with a groove 23 and, respectively, with a rib 24 of mating shape, longitudinally extending along the full length of the construction element 1.

Thus, a plurality of construction elements 1 arranged side-by-side may be stably connected together by means of a substantially mating joint.

Advantageously, moreover, the lugs 4, 5 are provided with a plurality of vertical ribs 25, pitchwise arranged along the length of the construction element 1 (FIG. 2).

The ribs 25, preferably integral with the lugs 4 and 5, carry out the advantageous function of supporting reinforcing rods placed between adjacent construction elements 1 at a predetermined distance from the remainder of the lugs, whereby the reinforcing rods can be fully embedded within the concrete casting.

The construction element 1 is provided with opposite faces 6, 7 respectively upper and lower, and incorporates two reinforcing section bars 8, 9 of identical construction which are arranged in mirror-image relationship about a longitudinal plane of symmetry y-y of the construction element 1.

The reinforcing section bars 8, 9 are longitudinally extending throughout the central body 2 of the construction element 1 substantially along its entire length, between said upper 6 and lower 7 faces.

Furthermore, the reinforcing section bars 8, 9 are substantially Z-shaped and comprise a central portion 10 and a pair of respectively lower and upper fins 11, 12 extending perpendicularly in opposite directions from the ends of the central portion 10.

In a preferred embodiment, the reinforcing section bars 8, 9 are formed by suitably shaping, by means of conventional equipment, a zinc-galvanized cold-rolled metal sheet having a thickness of about 0.8 mm.

Preferably, furthermore, the central portion 10 of the reinforcing section bars 8, 9 has a height of about 150 mm, while the opposite fins 11, 12 have an overall width of about 15 mm.

In a preferred embodiment, the upper fin 12 is fully embedded in the mass of expanded plastics, and has a first portion 12a, extending substantially perpendicularly to the central portion 10 of the reinforcing section bars 8, 9 and a second end portion 12b which is bent toward the central portion 10.

Preferably, the first portion 12a of the fin 12 has a length of about 15 mm, and the end portion 12b forms an angle ($\alpha$) of about 45° with the first portion 12a.

Tests carried out by the Applicant have shown that a construction element reinforced with section bars of this shape has self-supporting and compression strength characteristics which are quite comparable with those of a similar construction element reinforced with section bars having a thickness of 1.2 mm and not provided with bent fins 12.

The reinforcing section bars 8, 9 are advantageously provided with a plurality of openings, preferably circular holes obtained by punching, formed through the central portion 10.

These holes serve the dual purpose of lightening the reinforcing section bars 8, 9 and anchoring them more tightly within the mass of expanded plastics.

These holes are arranged in three parallel rows along the central portion 10 of the reinforcing section bars 8 and 9: a first central row of circular holes 13, having a prevailing diameter, arranged pitchwise along a median plane x-x of the section bars, and two side rows of circular holes 14 and 15, having smaller diameter, arranged on opposite parts with respect to the central row.

Preferably, the circular holes 14, 15 in the side rows have parallel axes and are arranged between two consecutive holes 13 of the central row, as shown in FIG. 1.

Preferably, the holes 13 have a diameter of about 60 mm, while the holes 14 and 15 have a diameter of about 30 mm, while the pitch spacing of all rows of holes 13-15 is of about 90 mm.

Thus, the holes 13-15 define a perforated area or void area which accounts for about 30% of the overall area of the reinforcing section bars 8 and 9, the term 'overall area'referring to the overall lateral surface area of the section bars (central portion 10 plus fins 11, 12).

In order to further increase the contact surface between the reinforcing section bars 8, 9 and the expanded plastics, the holes 13-15 formed through the central portion 10 may be advantageously provided along their peripheral edge with a protruding lip 30 (see FIGS. 5 and 6) adapted to be fully embedded within the mass of expanded plastics to anchor even more securely therein the reinforcing section bars.

Alternatively, the same advantageous function could be carried out by one or more protrusions 31 (see FIG. 6) distributed along their peripheral edge and angularly offset from one another.

According to the invention, the construction element 1 further comprises a lath 16 for supporting at least one layer 17 of a suitable covering material, such as plaster, welded to the lower fins 11 of the reinforcing section bars 8, 9.

As can be seen in FIG. 1, these fins 11 extend substantially flush with, and substantially parallel to, the lower face 7 of the construction element 1.

Advantageously, the opposite end portions of the lath 16 are bent into a first oblique portion 16a, completely embedded within the lugs 4, 5, and a second portion 16b extending in a substantially vertical direction, partly flush with the opposite lateral sides 28, 29 of the construction element 1.

Advantageously, the complete incorporation of the lath oblique portion 16a within the mass of expanded plastics, avoids the formation of thermal bridges between the lower and upper faces of the lugs 4 and 5 in a floor slab obtained by coupling several construction elements 1 arranged side-by-side.

The vertical portion 16b of the end portion of the lath 16 includes a section which extends flush with the construction element 1 within grooves 26, 27 longitudinally formed lengthwise in the opposite lateral sides 28, 29 of the construction element 1 above the lugs 4 and 5.

Advantageously, this section of the vertical portion 16b allows to stably anchor the lath 16 to the concrete cast into the cavity defined between the sides of adjacent construction elements 1.

Preferably, the lath 16 is a stretched mesh of a zinc galvanized cold-rolled metal sheet, which is adapted to receive cement, lime, or gypsum and is corrosion-resistant.

In a preferred embodiment, the lath 16 has a thickness of about 0.5 mm and is formed by a rhomb-shaped mesh having a length-to-height rhomb ratio of 2:1.

Preferably, furthermore, the rhomb length is of about 30 mm, while the rhomb height is of about 15 mm.

Advantageously, the construction element 1 described above is able to achieve at the same time both adequate self-supporting characteristics, as conferred thereto by the reinforcing section bars 8, 9 integrated within the mass of expanded plastics, and adequate fire-resisting properties thanks to the presence of the lath 16, firmly held in place by the same reinforcing section bars and, once installed, also by the concrete cast between adjacent construction elements.

The lath 16, in fact, is advantageously able to support the plaster layer 17 even when the mass of expanded plastics is partially or totally shrunk due to the effect of heat.

Figure 3:
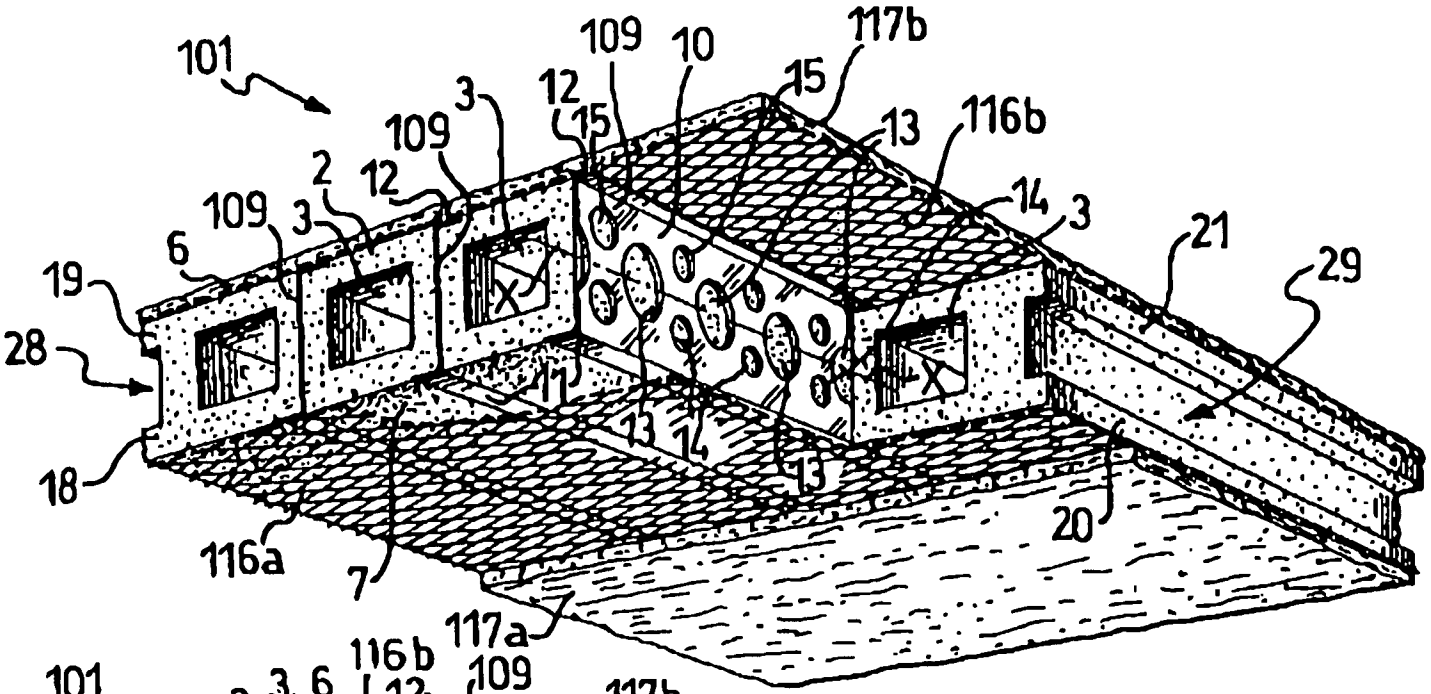
FIG. 3 shows a perspective view, in partial cross-section, of a second embodiment of a construction element according to the invention.
Figure 4:
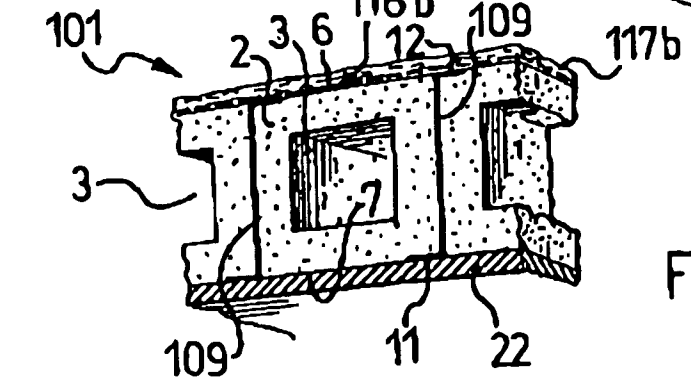
FIG. 4 shows a perspective view, in partial cross-section, of some details of a third embodiment of a construction element according to the invention.

FIGS. 3 and 4 schematically show further embodiments of the construction element 1 according to the invention.

In the following description and in these Figures, components of the construction element 1 which are structurally or functionally equivalent to those illustrated in connection with the previous embodiment will be indicated by the same reference numerals and will be no further described.

In a second embodiment of the invention, shown in FIG. 3, reference 101 indicates a wall element used for instance for erecting bearing and partition walls in a building.

The wall element 101 has in this case two pairs of side lugs, generally denoted by numerals 18-21, extending from the opposite lateral sides 28, 29 of the central body 2.

The wall element 101 includes a plurality of reinforcing section bars 109 transversely extending across the central body 2 of the construction element throughout the whole thickness thereof.

Thus, in this embodiment, both opposite fins 11, 12 of the reinforcing section bars 109, in this case rectilinear side fins, lie substantially flush with and parallel to the opposite faces 6, 7 of the wall element 101.

The latter may then include a pair of laths 116a, 116b, each adapted to support a respective covering layer 117a, 117b, such as plaster, welded to the opposite fins 11, 12 of the reinforcing section bars 109.

According to a third embodiment of the invention, shown in FIG. 4, furthermore, the wall element 101 may include a panel 22 of gypsum paperboard, wood, rigid plastics, or another suitable material for decorative and/or structural purposes, instead of the lath 116a, for example.

This panel 22 is fixed to the fins 11 of the reinforcing section bars 109 on the face 7 of the wall element 101 in a manner known per se, such as by a set of screws or dowels, not shown.

According to the nature of the selected covering element, having or not structural capabilities, the wall elements 101 of the invention may advantageously achieve load-bearing characteristics, that is being able to independently withstand possible static loads applied thereto.

Figures 7, 7A:
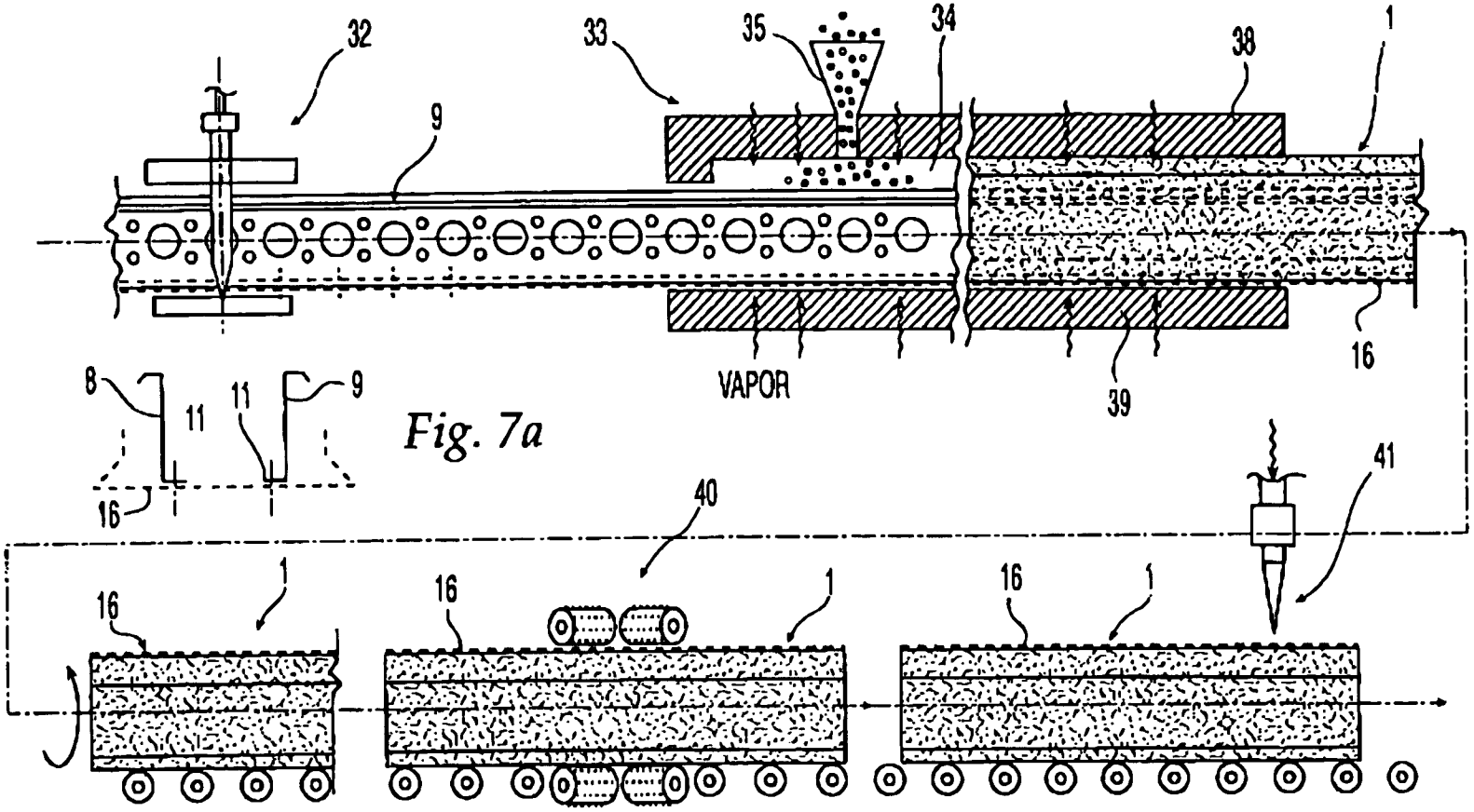
FIGS. 7, 7a, 8 and 9 show the sequential steps of a method of manufacturing a construction element.
Figure 8:
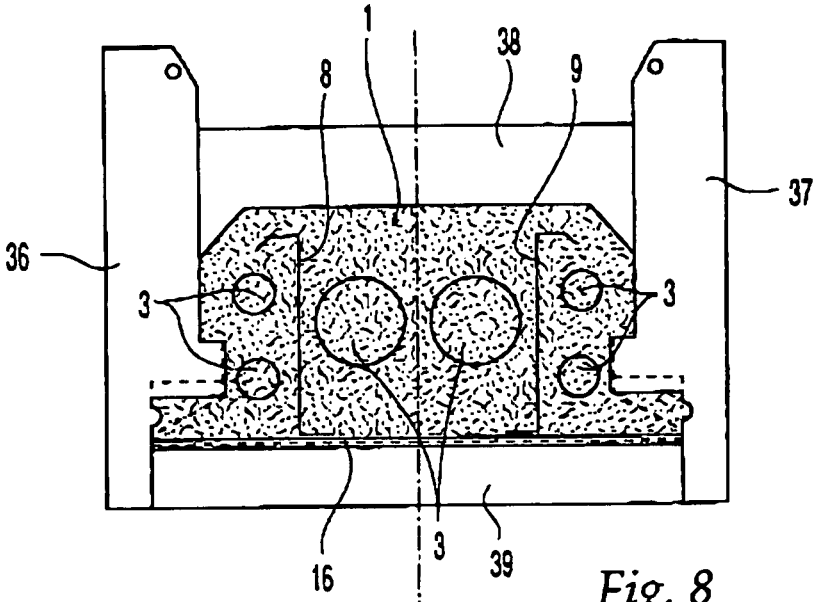
Figure 9:
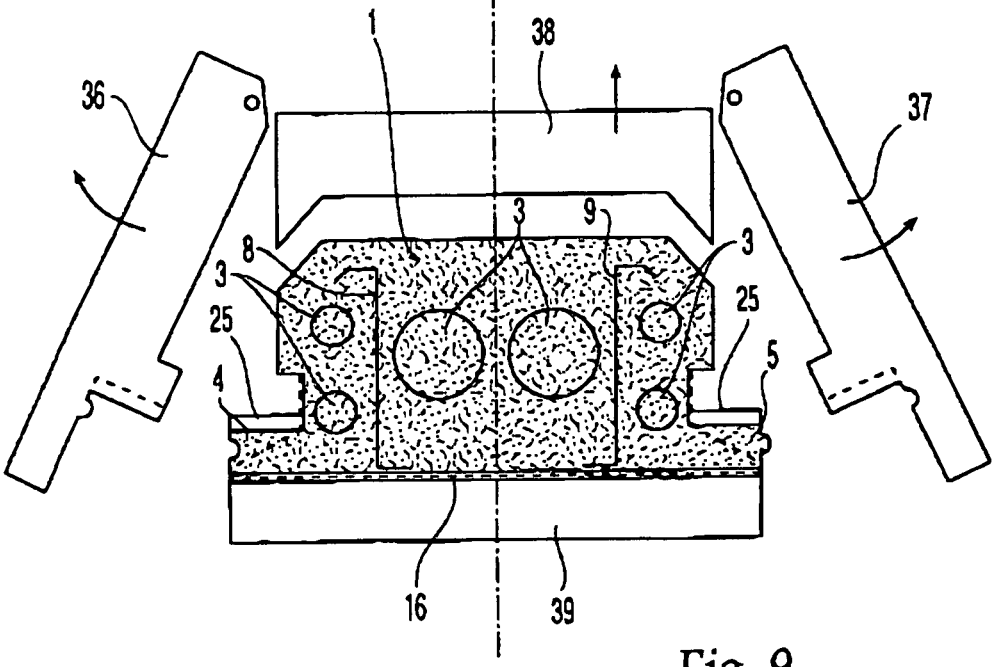

According to the invention, the construction elements described above can be manufactured by means of a method comprising the steps of:

associating a lathe 16 for supporting at least one layer 17 of a suitable covering material to a fin 11 extending from one end of a reinforcing bar section 9;

connecting the lathe 16 to the lower fins 11 of reinforcing bars 8 and 9 as shown in FIGS. 7 and 7a by means of a welding device;

positioning the thus associated reinforced section bar and lathe into a molding scat 34 of a molding apparatus 33 comprised of top and bottom walls 38 and 39 and side walls 36 and 37 as best seen in FIGS. 8 and 9, feeding expandable plastics granules through an injector 35 into the molding seat 34;

expanding and then bonding together the plastics granules in said molding seat 34 so as to imbed said reinforcing section bars 8 and 9 into a mass of expanded plastics having a predetermined shape and to maintain said lathe 16 at least in part substantially flush with the mass of expanded plastics;

scraping the construction element surface by means of scraping elements 40 to remove the outermost layer or skin of the expanded plastics; and subjecting the mass of plastics of the construction element to a surface thermal treatment by means of a heating device 41 for feeding a sheet of warm air toward the element 1 thereby partly or fully enucleating said lathe from the mass of expanded plastics and enucleating the surface of the fin 12 by rollers 40 directly opposite the rollers 40 which enucleate the lathe as shown in FIG. 7.

Figure 10:
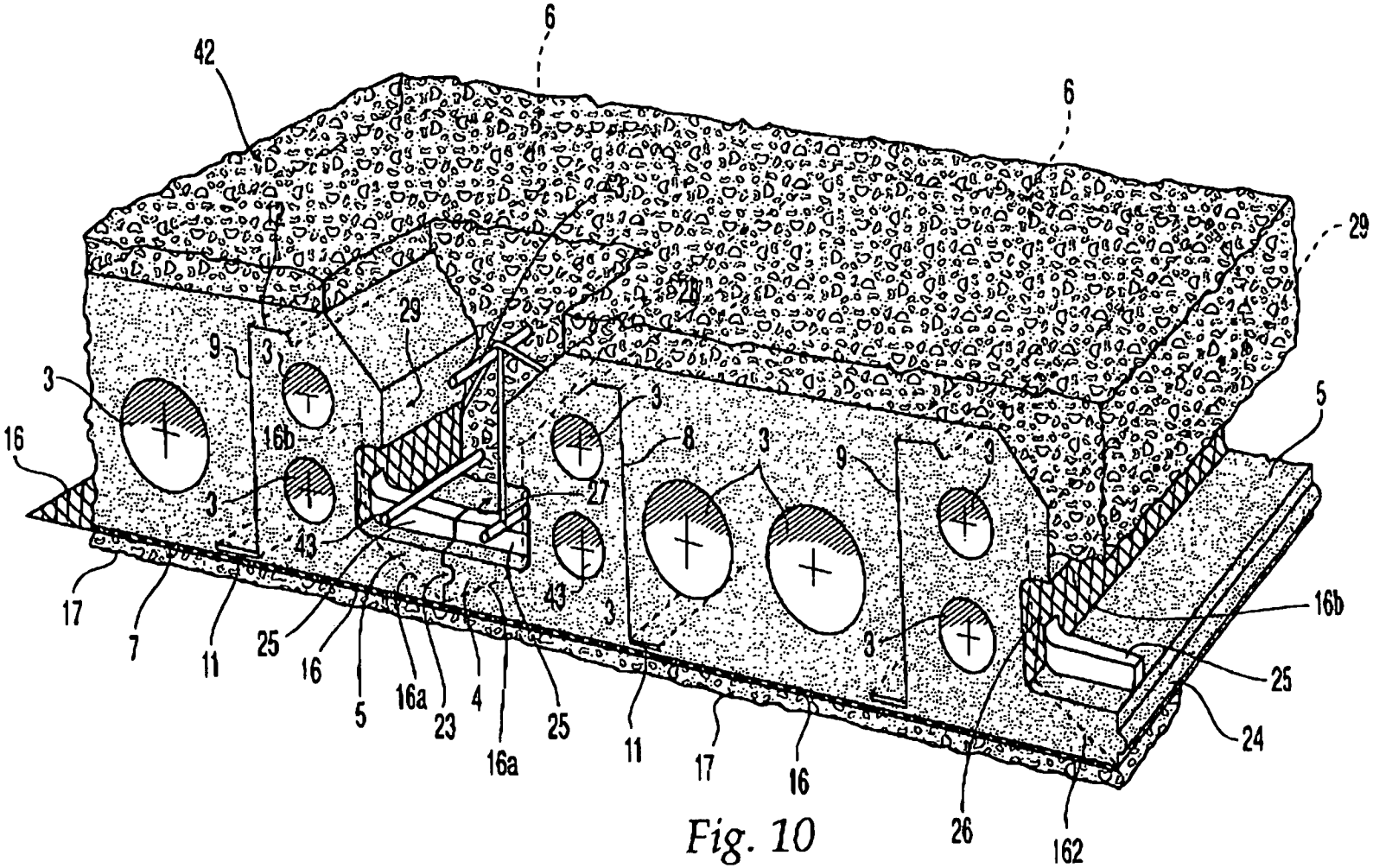
FIG. 10 is a perspective view of a modified construction assembly according to the present invention.

A construction assembly as shown in FIG. 10 includes at least two side by side construction elements wherein the reinforcing members 8 and 9 are secured to a lathe 16 and encased in expanded plastic material. A concrete casting 42 covers one side of the construction elements and fills the cavity defined between opposite lateral sides of adjacent construction elements. Reinforcing rods 43 are located in the cavity prior to the casting of the concrete.

Obviously, those skilled in the art may introduce variants and modifications to the above described invention, in order to satisfy specific and contingent requirements, variants and modifications which fall anyhow within the scope of protection as is defined by the following claims.

What is claimed is:

1. A self-supporting construction element of expanded plastics, comprising:

a) a central body, substantially parallelepipedic in shape, provided with opposite faces;

b) at least one reinforcing section bar transversely extending across the central body between said opposite faces and embedded in the expanded plastics; and c) a first stretched mesh for supporting at least one layer of a suitable covering material, said stretched mesh being associated with a fin of said reinforcing section bar lying flush with and substantially parallel to at least one of the faces of said construction element.

2. Construction element according to claim 1, wherein the reinforcing section bar is longitudinally extending within the central body along substantially the entire length thereof.

3. Construction element according to claim 1, wherein the reinforcing section bar has a thickness of form 0.4 to 1.2 mm.

4. Construction element according to claim 1, wherein the first stretched mesh for supporting at least one covering layer comprises opposite lateral portions lying at least in part flush with opposite lateral sides of the construction element.

5. Construction element according to claim 1, wherein the stretched mesh essentially consists of a rhomb-shaped mesh having a length-to-height rhomb ratio of 2:1.

6. Construction element according to claim 1, wherein the stretched mesh as a thickness of from 0.4 to 1.5 mm.

7. Construction element according to claim 1, further comprising a layer of plaster, cement, or cement reinforced with fibers of s suitable fire-retarding or fire-resistant material, associated to the first stretched mesh.

8. Construction element according to claim 1, wherein the reinforcing section bar transversely extends across the central body through the whole thickness thereof.

9. Construction element according to claim 8, wherein the reinforcing section bar comprises a pair of opposite fins lying flush with and substantially parallel to the faces of the construction element.

10. Construction element according to claim 9, further comprising a second stretched mesh for supporting at least one covering layer, the first and the second meshes being respectively associated to the opposite fins of the reinforcing section bar.

11. Construction element according to claim 9, further comprising a rigid covering element associated to the reinforcing section bar at a side opposite with respect to the first stretched mesh.

12. Construction element according to claim 11, wherein the rigid covering element is one of a panel of gypsum paperboard, wood, a rigid plastics, a decorating material, and a structural material.

13. Construction element according to claim 1, wherein the reinforcing section bar is provided with a plurality of openings formed in a central portion thereof.

14. Construction element according to claim 13, wherein the openings have a total area comprised between 10% and 60% of the overall surface areas of the reinforcing section bar.

15. Construction element according to claim 13, wherein the openings have a circular cross-section with a diameter of from 15 to 150 mm.

16. Construction element according to claim 13, wherein the openings are peripherally provided with a lip protruding from the central portion and fully embedded in the expanded plastics.

17. Construction element according to claim 13, wherein the openings are provided with one or more protrusions being distributed around their peripheral edge and angularly offset from one another, the protrusions being fully embedded in the expanded plastics.

18. A method of manufacturing a construction element according to any one of claims 1-17, comprising the steps of:

associating a stretched mesh for supporting at least one layer of a suitable covering material to a fin extending from one end of a reinforcing section bar;

positioning the thus associated reinforcing section bar and stretched mesh into a molding seat of a suitable apparatus for molding plastics;

feeding expandable plastics granules into the molding seat; and expanding and then boding together the plastics granules in the molding seat so as to embed the reinforcing section bar into a mass of expanded plastics having a predetermined shape and to maintain the stretched mesh at least in part substantially flush with the mass of expanded plastics.

19. A method according to claim 18, wherein the stretched lath and the reinforcing section bar are associated with each other by welding.

20. The method according to claim 18, wherein the stretched mesh is a stretched metallic lath essentially consisting of a rhomb-shaped mesh having a length-to-height rhomb ratio of 2:1.

21. A method according to claim 18, further comprising an additional step of enucleating at least part of the stretched mesh from the mass of expanded plastics.

22. A method according to claim 21, wherein the stretched mesh is enucleated from the mass of expanded plastics by means of a thermal treatment carried out by feeding onto the mass a sheet of warm air heated at a temperature of from 220° to 260° C.

23. A method according to claim 22, wherein the thermal treatment is preceded by a step of scraping a skin layer off the mass of expanded plastics.

24. A method of manufacturing a construction element according to any one of claims 1-17, comprising the steps of:

positioning a reinforcing section bar, provided with at least one fin at one end, into a molding seat of a suitable apparatus for molding plastics;

feeding expandable plastics granules into the molding seat;

expanding and then bonding together with plastics granules in the molding seat so as to embed the reinforcing section bar into a mass of expanded plastics having a predetermined shape and to maintain the at least one fin substantially flush with the mass of expanded plastics; and associating a stretched mesh for supporting at least one layer of a suitable covering material to the at least one fin of the reinforcing section bar.

25. A method according to claim 24, further comprising an additional step of enucleating the at least one fin of the reinforcing section bar from the mass of expanded plastics.

26. A method according to claim 25, wherein the at least one fin is enucleated from the mass of expanded plastics by means of a thermal treatment carried out by feeding onto the mass a sheet of warm air heated to a temperature of from 220° to 260° C.

27. A self-supporting construction element of expanded plastics, comprising:

a) a central body, substantially parallelepipedic in shape, provided with opposite faces;

b) a plurality of reinforcing section bars transversely extending across the central body between said opposite faces embedded in the expanded plastics; the reinforcing section bars being substantially Z-shaped and arranged in mirror image relationship about a longitudinal plane of symmetry of the construction element and comprising a central portion and a pair of respectively lower and upper fins extending perpendicularly in opposite directions from the ends of the central portion; at least one of said lower and upper fins lying flush with and substantially parallel to at least one of said opposite faces of the construction element; and c) a sheet-like member for supporting at least one layer of a suitable covering material associated to said at least one fin lying flush with and substantially parallel to at least one of the faces of said construction element.

28. A self-supporting construction element according to claim 27, wherein said upper fin of the reinforcing section bar has a first portion, extending substantially perpendicularly to the central portion of the reinforcing section bar and a second end portion which is bent toward the central portion.

29. A self-supporting construction element according to claim 27, wherein said upper fin of the reinforcing section bar extends from the central portion of the reinforcing section bar towards a lateral side of the construction element.

30. Construction element according to claim 27, wherein the reinforcing section bar transversely extends across the central body through the whole thickness thereof.

31. Construction element according to claim 27, wherein the reinforcing section bar is longitudinally extending within the central body along substantially the entire length thereof.

32. Construction element according to claim 27, wherein the sheet-like member for supporting at least one covering layer comprises opposite lateral portions lying at least in part flush with opposite lateral sides of the construction element.

33. Construction element according to claim 27, wherein the sheet-like member for supporting at least one covering layer is a stretched metallic lath essentially consisting of a rhomb-shaped mesh having a length-to-height rhomb ratio of 2:1.

34. Construction element according to claim 33, further comprising a layer of plaster, cement or cement reinforced with fibers material, associated to the supporting lath.

35. Construction element according to claim 27, wherein the reinforcing section bar is provided with a plurality of openings formed in a central portion thereof.

36. Construction element according to claim 35, wherein the openings are peripherally provided with a lip protruding from said central portion and fully embedded in said expanded plastics.

37. Construction element according to claim 35, wherein the openings are provided with one or more protrusions being distributed around their peripheral edge and angularly offset from one another, the protrusions being fully embedded in the expanded plastics.

38. Construction element according to claim 27, wherein the reinforcing section bar comprises a pair of opposite fins lying flush with and substantially parallel to the opposite faces of the construction element.

39. Construction element according to claim 38, further comprising a second lath for supporting at least one covering layer, the first and the second laths being respectively associated to the opposite fins of the reinforcing section bar.

40. Construction element according to claim 38, further comprising a rigid covering element associated to the at least one fin of the reinforcing section bar.

41. Construction element according to claim 40, wherein the rigid covering element is one of a panel of gypsum paperboard, wood, and a rigid plastic.

42. A construction assembly comprising:

a plurality of [element] *elements* of expanded plastics arranged side-by-side, said element including:

a) a central body, substantially parallelepipedic in shape, provided with opposite upper and lower faces and with opposite lateral sides;

b) at least one reinforcing section bar transversely extending across the central body between said upper and lower faces and embedded in the expanded plastics;

c) a sheet-like member for supporting at least one layer of a suitable covering material, said sheet-like member being associated to a fin of said reinforcing section bar lying flush with and substantially parallel to at least one of the faces of said construction element;

a concrete casting housed in a cavity defined between said opposite lateral sides of adjacent element of said plurality of elements of expanded plastics; and means for stably anchoring the sheet-like member to said concrete casting.

43. A construction assembly according to claim 42, wherein said reinforcing section bar is longitudinally extending within said central body of the elements of expanded plastics along substantially the entire length thereof.

44. A construction assembly according to claim 42, wherein said reinforcing section bar is provided with a plurality of openings formed in a central portion thereof.

45. A construction assembly according to claim 42, wherein said means for stably anchoring the sheet-like member to the concrete casting comprises an end portion of the sheet-like member extending in a substantially vertical direction and lying partly flush with the opposite lateral sides of said elements of expanded plastics.

46. A construction assembly according to claim 45, wherein said end portion of the sheet-like member extends flush with said element of expanded plastics within grooves longitudinally formed lengthwise in the opposite lateral sides of said elements of expanded plastics.

47. A construction assembly according to claim 42, wherein said sheet-like member for supporting at least one layer of a suitable covering material is a stretched metallic lath essentially consisting of a rhomb-shaped mesh having a length-to-height rhomb ratio of 2:1.

48. A construction assembly according to claim 47, further comprising a layer of plaster, cement, or cement reinforced with fiber material, associated to said sheet-like member.

49. A construction assembly according to claim 42, wherein said elements of expanded plastics further comprise a pair of lugs laterally and longitudinally extending along the opposite sides of said central body.

50. A construction assembly according to claim 49, further comprising a substantially mating joint for stably connecting side-by-side said elements of expanded plastics.

51. A construction assembly according to claim 50, wherein said substantially mating joint comprises a groove and a rib of mating shape laterally formed in the lugs of the elements of expanded plastics and longitudinally extending along the full length thereof.

52. A construction assembly according to claim 49, further comprising a plurality of reinforcing rods embedded in the concrete casting housed in the cavity defined between said opposite lateral sides of adjacent elements of expanded plastics.

53. A construction assembly according to claim 52, further comprising means for supporting said plurality of reinforcing rods at a predetermined distance from the lugs of the elements of expanded plastics.

54. A construction assembly according to claim 53, wherein said supporting means comprises a plurality of ribs extending from the lugs of the elements of expanded plastics and pitchwise arranged along the length thereof.

55. A construction assembly for erecting bearing and partition walls in a building comprising:

a plurality of wall elements of expanded plastics arranged side-by-side, said elements including:

a) a central body, substantially parallelepipedic in shape, provided with opposite upper and lower faces and with opposite lateral sides and with at least one cavity;

b) at least one reinforcing section bar transversely extending across the central body between said upper and lower faces and embedded in the expanded plastics;

c) a sheet-like member for supporting at least one layer of a suitable covering material, said sheet-like member being associated to a fin of said reinforcing section bar lying flush with and substantially parallel to at least one of the faces of said wall elements; and a concrete casting housed in the at least one cavity defined within the central body of said wall elements and between opposite lateral sides of adjacent elements of said plurality of wall elements of expanded plastics.

56. A construction assembly according to claim 55, wherein said reinforcing section bar is provided with a plurality of openings formed in a central portion thereof.

57. A construction assembly as set forth in claim 55, wherein said partition walls comprise at least one cavity filled with concrete.

58. A construction assembly according to claim 55, wherein said sheet-like member is a stretched metallic lath essentially consisting of a rhomb-shaped mesh having a length-to-height rhomb ratio of 2:1.

59. A construction assembly according to claim 58, further comprising a layer of plaster, cement, or cement reinforced with fiber material, associated to said sheet-like member.

60. A construction assembly according to claim 55, wherein said reinforcing section bar transversely extends across said central body through the whole thickness thereof.

61. A construction assembly according to claim 60, wherein said reinforcing section bar comprises a pair of opposite fins lying flush with and substantially parallel to the faces of said wall element.

62. A construction assembly according to claim 61 further comprising a pair of sheet-like members for supporting at least one covering layer, said sheet-like members being respectively associated to said opposite fins of the reinforcing section bar.

63. A construction assembly according to claim 61, wherein said reinforcing section bar is longitudinally extending within said central body along substantially the entire length thereof.

64. A construction assembly according to claim 61, further comprising a rigid covering element associated to said reinforcing section bar at a side opposite with respect to said sheet-like member.

65. A construction assembly according to claim 64, wherein said rigid covering element is one of a panel of gypsum paperboard, wood, and a rigid plastic.

*66. A self-supporting construction element of expanded plastics, comprising:*

*a) a central body, substantially parallelepipedic in shape, provided with opposite faces and uncovered opposite lateral sides exposing said expanded plastics;*

*b) a plurality of reinforcing section bars transversely extending across the central body between said opposite faces and embedded in the expanded plastics between said opposite lateral sides so as to leave said opposite lateral sides uncovered; the reinforcing section bars being provided with a substantially Z-shaped and arranged in mirror image relationship about a longitudinal plane of symmetry of the construction element and comprising a central portion and a pair of respectively lower and upper fins extending perpendicularly in opposite directions from the ends of the central portion; at least one of said lower and upper fins lying flush with and substantially parallel to at least one of said opposite faces of the construction element, and*

*c) a rigid covering element associated to said at least one fin lying flush with and substantially parallel to at least one of said opposite faces of the construction element.*

*67. Construction element according to claim 66, wherein the reinforcing section bar transversely extends across the central body through the whole thickness thereof.*

*68. Construction element according to claim 66, wherein the rigid covering element is a panel of gypsum paperboard, wood, a rigid plastics, or another suitable material.*

*69. Construction element according to claim 66, wherein the reinforcing section bar is longitudinally extending within said central body along substantially the entire length thereof.*

*70. Construction element according to claim 66, wherein the reinforcing section bar is provided with a plurality of openings formed in the central portion thereof.*

*71. Construction element according to claim 70, wherein the openings have a total area comprised between 10% and 60% of the overall surface area of the reinforcing section bar.*

*72. Construction element according to claim 70, wherein the openings have a circular cross-section with a diameter of from 15 to 150 mm.*

*73. Construction element according to claim 70, wherein the openings are peripherally provided with a lip protruding from the central portion and fully embedded in said expanded plastics.*

*74. Construction element according to claim 70, wherein the openings are provided with one or more protrusions being distributed around their peripheral edge and angularly offset from one another, said protrusions being fully embedded in the expanded plastics.*

*75. A construction assembly comprising:*

*a plurality of elements of expanded plastics arranged side-by-side, said elements including:*

*a) a central body, substantially parallelepipedic in shape, provided with opposite upper and lower faces and with opposite lateral sides;*

*b) at least one reinforcing section bar transversely extending across the central body between said upper and lower faces and embedded in the expanded plastics;*

*c) a rigid covering element associated to a fin of said reinforcing section bar lying flush with and substantially parallel to at least one of the faces of said wall elements; and*

*a concrete casting housed in a cavity defined between said opposite lateral sides of adjacent elements of said plurality of elements of expanded plastics and over the central body thereof; and*

*means for stably anchoring the rigid covering element to said concrete casting.*

*76. A construction assembly according to claim 75, wherein said reinforcing section bar is longitudinally extending within said central body of the elements of expanded plastics along substantially the entire length thereof.*

*77. A construction assembly according to claim 75, wherein said reinforcing section bar is provided with a plurality of openings formed in a central portion thereof.*

*78. A construction assembly according to claim 75, wherein said elements of expanded plastics further comprise a pair of lugs laterally and longitudinally extending along the opposite sides of said central body.*

*79. A construction assembly according to claim 78, further comprising a substantially mating joint for stably connecting side-by-side said elements of expanded plastics.*

*80. A construction assembly according to claim 79, wherein said substantially mating joint comprises a groove and a rib of mating shape laterally formed in the lugs of the elements of expanded plastics and longitudinally extending along the full length thereof.*

*81. A construction assembly according to claim 75, further comprising a plurality of reinforcing rods embedded in the concrete casting housed in the cavity defined between said opposite lateral sides of adjacent elements of expanded plastics.*

*82. A construction assembly according to claim 78, further comprising means for supporting said plurality of reinforcing rods at a predetermined distance from the lugs of the elements of expanded plastics.*

*83. A construction assembly according to claim 82, wherein said supporting means comprises a plurality of ribs extending from the lugs of the elements of expanded plastics and pitchwise arranged along the length thereof.*

*84. A construction assembly for erecting bearing and partition walls in a building comprising:*

*a plurality of wall elements of expanded plastics arranged side-by-side, said elements including:*

*a) a central body, substantially parallelepipedic in shape, provided with opposite upper and lower faces and with opposite lateral sides and with at least one cavity;*

*b) at least one reinforcing section bar transversely extending across the central body between said upper and lower faces and embedded in the expanded plastics;*

*c) a rigid covering element associated to a fin of said reinforcing section bar lying flush with and substantially parallel to at least one of the faces of said wall elements; and*

*a concrete casting housed in the at least one cavity defined within the central body of said wall elements and between opposite lateral sides of adjacent elements of said plurality of wall elements of expanded plastics.*

*85. A construction assembly according to claim 84, wherein said rigid covering element is a panel of gypsum paperboard, wood, a rigid plastics, or another suitable material.*

*86. A construction assembly according to claim 84, wherein said at least one reinforcing section bar transversely extends across said central body through the whole thickness thereof.*

*87. A construction assembly according to claim 84, wherein said at least one reinforcing section bar comprises a pair of opposite fins lying flush with and substantially parallel to the faces of said wall element.*

*88. A construction assembly according to claim 84, wherein said at least one reinforcing section bar is longitudinally extending within said central body along substantially the entire length thereof.*

*89. A construction assembly according to claim 84, wherein said at least one reinforcing section bar is provided with a plurality of openings formed in a central portion thereof.*

* * * * *